US012526163B2

(12) United States Patent
Lindskog et al.

(10) Patent No.: US 12,526,163 B2
(45) Date of Patent: Jan. 13, 2026

(54) STORAGE DEVICE AUTHENTICATING HOST CREDENTIAL AND UTILIZING PHYSICALLY UNCLONABLE FUNCTION (PUF) FOR DATA ENCRYPTION/DECRYPTION

(71) Applicant: TELEFONAKTIEBOLAGET LM ERICSSON (PUBL), Stockholm (SE)

(72) Inventors: Niklas Lindskog, Lund (SE); Håkan Englund, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 131 days.

(21) Appl. No.: 18/567,689

(22) PCT Filed: Jun. 7, 2021

(86) PCT No.: PCT/IB2021/054982
§ 371 (c)(1),
(2) Date: Dec. 6, 2023

(87) PCT Pub. No.: WO2022/259012
PCT Pub. Date: Dec. 15, 2022

(65) Prior Publication Data
US 2024/0275617 A1    Aug. 15, 2024

(51) Int. Cl.
*H04L 9/32*         (2006.01)
*G06F 21/78*        (2013.01)

(52) U.S. Cl.
CPC .......... *H04L 9/3278* (2013.01); *G06F 21/78* (2013.01)

(58) Field of Classification Search
CPC ....... H04L 9/3278; G06F 21/78; G06F 21/30; G06F 21/62
See application file for complete search history.

(56) References Cited

U.S. PATENT DOCUMENTS 9,214,183 B2    12/2015   Van Rijnswou
10,079,678 B2    9/2018   Smith et al.
(Continued)

FOREIGN PATENT DOCUMENTS

CN     109522758 A    3/2019
CN     110233729 A    9/2019

OTHER PUBLICATIONS

Trusted Computing Group, "Trusted Computing Group and NVM Express Joint White Paper: TCG Storage, Opal, and NVMe", nvm Express, Aug. 2015.
(Continued)

*Primary Examiner* — J. Brant Murphy
(74) *Attorney, Agent, or Firm* — Murphy, Bilak & Homiller, PLLC (57) ABSTRACT

Systems and methods are disclosed herein for protecting data in a storage device by encrypting or decrypting the data with a Data Encryption Key (DEK). The storage device is communicatively coupled to a host. In one example, the storage device receives a credential from the host and authenticates the credential with a transformed credential. A Physically Unclonable Function (PUF) generates a PUF response based on a challenge, responsive to successful authentication of the credential from the host. Based on the PUF response, a DEK generation module in the storage device generates a DEK. A crypto module in the storage device uses the DEK and performs encryption of data to be stored in the storage device and/or decryption of data being assessed by the host.

30 Claims, 7 Drawing Sheets (56) References Cited

U.S. PATENT DOCUMENTS

| | | |
|---|---|---|
| 10,097,348 B2 | 10/2018 | Kara-Ivanov et al. |
| 2010/0199103 A1* | 8/2010 | Van Rijnswou ...... H04L 9/0866 713/189 |
| 2013/0142329 A1* | 6/2013 | Bell ...................... H04L 9/0866 380/44 |
| 2014/0032933 A1* | 1/2014 | Smith ..................... G06F 21/31 713/193 |
| 2017/0279606 A1* | 9/2017 | Kara-Ivanov ............ G09C 1/00 |
| 2020/0053061 A1* | 2/2020 | Cambou ............. H04L 63/0457 |
| 2021/0258174 A1* | 8/2021 | Schoinianakis ....... G06F 21/602 |
| 2024/0072996 A1* | 2/2024 | Webb ................... H04L 9/0838 |

OTHER PUBLICATIONS

Trusted Computing Group, et al. "Trusted Computing Group and NVMe Work Group Joint White Paper: TCG Storage, Opal, and NVMe", Aug. 2015.

* cited by examiner

STORAGE DEVICE AUTHENTICATING HOST CREDENTIAL AND UTILIZING PHYSICALLY UNCLONABLE FUNCTION (PUF) FOR DATA ENCRYPTION/DECRYPTION

PRIORITY CLAIM

This application is a national stage application of International Patent Application No. PCT/IB2021/054982, filed Jun. 7, 2021, the disclosure disclosures of which is hereby incorporated in its entirety by reference.

TECHNICAL FIELD

The present disclosure relates to a secure storage device and, more specifically, to a secure storage device that authenticates a credential received from a host and utilizes a Physically Unclonable Function (PUF) for encrypting and/or decrypting data in the secure storage device.

BACKGROUND

Physically Unclonable Functions (PUFs)

Physically Unclonable Functions (PUFs) are circuits, components, processes, or other entities capable of generating an output, such as a key, a digital identity, or authentication data. A PUF should be resistant to cloning. For example, a device having a PUF would be difficult to clone, as it is ideally infeasible to model the PUF and precisely recreate it on another device.

PUFs are used to create a unique response by using implicit or explicit randomness. This response can be used for cryptographic or device identity purposes. Implicit randomness may include unpredictable manufacturing differences in semiconductor devices that can be exploited to create a device-unique response. On the other hand, explicit randomness means that the introduction of randomness requires extra steps during manufacturing or a later stage, e.g., at packaging.

A PUF comprises one or several subfunctions, sometimes called elements or components, which each contributes a part of the PUF response. One example of the subfunctions of a PUF is a ring-oscillator pair. A ring oscillator is formed by an uneven number of signal inverters in a ring, where gate delay propagation is used as a randomness source. The PUF response is based on a comparison between the two ring-oscillators where the number of oscillations at a given point is measured. In particular, the PUF response may be an identifier of the fastest ring oscillator or the slowest ring oscillator. Another example of the subfunctions of a PUF may be uninitialized Static Random Access Memory (SRAM) cells, which have two possible states (0 and 1). Prior to power-up, the SRAM cell is in neither state. At power-up, the SRAM cell stabilizes in one of the two states. The PUF response is the entered state of a set of SRAM cells. Yet another example is an arbiter. An arbiter might be regarded as a digital race condition between two or more signal paths on a chip where a so-called arbiter circuit identifies the winning signal. The paths might comprise several switch blocks, which can alter the signal paths. For example, the PUF response can be an identification of the winning signal. In some PUF entities, the same subfunction(s) might generate several outputs by utilizing different parts of the PUF challenge. Each subfunction also has the property that it is physically unclonable, i.e., unique for the device. A PUF may therefore comprise several subfunctions which can be used as independent PUFs, albeit with fewer possible challenges and fewer response bits.

The PUF response can be used to create a unique device identity or a device-unique key without having to store the key in, e.g., Battery Backup Random Access Memory (BBRAM) or One Time Programmable (OTP) memory. Hence, it is much harder for an attacker to mount certain types of hardware attacks with the goal of recovering the key from a device using a PUF.

There are several types of PUFs, but all PUFs accept a challenge as input. The PUFs generally translate the challenge into either (i) a selection of at least one element within the PUF or (ii) a configuration of at least one element within the PUF. Depending on what type of PUF is used, the number of challenges, which are accepted by the PUF, can vary from just one to an exponential amount related to the number of subfunctions. In the present disclosure, the challenge is considered to be an input to the PUF that creates a specified number of response bits. The present disclosure may include activating the PUF several times using different subsections of the challenge where each subsection generates at least one part of the response.

Most PUF types additionally require helper data to function properly, i.e., to increase the possibility of recreating the same response given the same challenge. Some PUF types can remap the challenge-response mapping one or several times, i.e., after the remapping, some or all challenges may result in new responses.

A reconfigurable PUF can alter the entire challenge space, e.g., to make sure that all challenges receive a new response. An erasable PUF is a PUF that has the possibility to change responses of specific challenges. Alternatively, the PUF might respond with a null sequence, for example, all zeros, for challenges marked as "erased." When a PUF response (or a derivation thereof) is used to encrypt another cryptographic key, the PUF response is called a Key Encryption Key (KEK).

Self-Encrypting Drive (SED)

Encrypting digital information is essential for the protection of its confidentiality. Protection of data at rest is discussed in the present disclosure. Several solutions exist, i.e., with a granularity from encrypting files, containers, volumes, or entire disks. Encrypting the entire disk is called Full Disk Encryption (FDE), which may be performed both by a host using a software application and by a storage device, called a Self-Encrypting Drive (SED), using hardware. Throughout the present disclosure, the SED and the storage device are used interchangeably.

The SED is a term for a storage device that stores the data in encrypted form. The encryption happens seamlessly from the perspective of the host machine. The SED is popular because the SED does not increase a computation load on the main Central Processing Unit (CPU), while the software-based FDE does. The SED is potentially more resistant to cold boot and Direct Memory Access (DMA) attacks, where attackers can steal the encryption key from the computer's Random-Access Memory (RAM). Typically, the encryption itself is performed by a dedicated Advanced Encryption Standard (AES) accelerator on the SED.

The storage on a SED can generally be said to be divided into three regions, an administrative region, a credential storage region, and a data storage region. The data storage region may be divided into several ranges, sometimes called bands or sections. Each range may belong to a different user, but multiple users can also be configured to be able to unlock the same range independently.

In order to perform encryption on a SED, a Data Encryption Key (DEK), sometimes called a Media Encryption Key (MEK), is usually stored within a protected region of the drive. The DEK may be stored in cleartext, but the best practice recommendation is to store the DEK in an encrypted form. If the key is in plaintext, the disk storage is encrypted but, after power-up, the disk storage functions as a normal disk from the perspective of a user. If the DEK is encrypted, the user must supply a password used to derive an Authentication Key (AK), sometimes called the KEK, which decrypts the DEK. A SED may contain several DEKs encrypted with either the same or different passwords. Each DEK encrypts a specific range of the disk if the disk includes multiple ranges of data. If only one range exists, the DEK encrypts the entire data storage on the SED.

When the DEK(s) is stored in the SED in encrypted form, after the AK has decrypted the DEK(s), the decrypted DEK(s) are stored in volatile memory during an operation of the SED, enabling the decrypted DEK(s) to be used by a crypto module when needed. If the DEK(s) are erased, e.g. due to a power cycle, the password used to create the AK must be re-entered.

Aspects of SEDs may be standardized by standardization bodies, such as the Trusted Computing Group (TCG) Opal standard. The TCG Opal standard defines expected protocols and features of a SED device, e.g., supporting the AES with 128-bit keys or 256-bit keys and being able to erase keys upon request. The TCG Opal standard is mainly aimed at integrated and cloud-based drives, albeit nothing in the TGC Opal standard prohibits other drives, e.g. Universal Serial Bus (USB) connected drives, from conforming with the TGC Opal standard. There also exists a subset of the TCG Opal standard, called TCG Opalite, that supports fewer users and only a single range.

Advanced Technology Attachment (ATA) security is another standard relevant for the SED. However, the ATA security does not define any cryptographic capabilities for the storage devices, only that passwords should be used to unlock the drive. The ATA security further allows "master passwords" (unless "master password capability—maximum" is used) that must be able to overrule all other passwords. Due to this restriction, no encryption keys may be derived from by user passwords.

SUMMARY

Embodiments of a storage device authenticating a credential received from a host and utilizing a Physically Unclonable Function (PUF) for data encryption and/or decryption and related methods are disclosed herein. In one embodiment, a storage device for protecting data by encrypting with a Data Encryption Key (DEK) is communicatively coupled to a host. The storage device comprises an authentication module configured to receive at least one credential from the host, generate a first transformed credential based on the at least one credential, obtain a second transformed credential from storage, and evaluate the first transformed credential with the second transformed credential, the PUF configured to generate a PUF response based on a challenge, responsive to successful authentication of the at least one credential by the authentication module, a DEK generation module configured to obtain a first input related to the PUF response and generate a DEK based on the first input; and a cryptographic module configured to obtain the DEK from the DEK generation module and perform encryption of data to be stored in encrypted data storage of the storage device using the DEK and/or decryption of data that is accessed by the host from the encrypted data storage of the storage device using the DEK.

The storage device can facilitate seamless, on-device encryption of the data storage by authenticating a credential received from a host and, responsive to successful authentication of the credential, using a PUF of a storage device to create a DEK. The PUF of the storage device generates its responses that can be used as unique device identities without having to store the device identifies (keys) in a memory of the storage device. Thus, it is much harder for an attacker to steal the device identities (keys) from the storage device. In other words, the storage device does not have keys that can be overwritten, stolen, injected with errors, or brute-forced offline by the attacker. Further, the storage device is protected against the attacker gaining information regarding the PUF, as the host must be authenticated prior to generating the keys to decrypt the storage device. As the PUF is device-unique, the response cannot be replicated on a different device. The attacker who manages to extract data and hashed password must have continued access to the device to break the data. Some embodiments of the present disclosure also include an added security measure where the credentials and associated data can be encrypted by the PUF when stored, which adds another layer of security. Some embodiments of the present disclosure may be compliant with relevant standards for encrypted hard drives such as Trusted Computing Group (TCG) Opal 2.0, Opalite 2.0 and Advanced Technology Attachment (ATA) security.

In one embodiment, the authentication module further comprises a One-Way Function (OWF) configured to receive the at least one credential from the host and generate the first transformed credential based on the at least one credential. In one embodiment, the challenge is based on: (a) the at least one credential, (b) a stored, pre-generated challenge, or (c) a combination thereof.

In one embodiment, the DEK generation module comprises a Key Derivation Function (KDF) configured to obtain the first input related to the PUF response and generate the DEK based on the first input. In one embodiment, the storage device is configured to store a plurality of challenges associated with a plurality of credentials, respectively. The at least one credential received from the host is at least one of the plurality of credentials, and the PUF is configured to obtain the challenge from the storage. The challenge is one of the plurality of challenges and is associated with the at least one credential received from the host. In one embodiment, the authentication module is configured to provide the challenge to the PUF. The challenge is equal to (a) a transformed credential, (b) a further transformed version, using the OWF, of the transformed credential, or (c) a second output generated based on the at least one credential by the OWF that is differently parametrized.

In one embodiment, the KDF is additionally configured to obtain a set of parameters from the storage and generate the DEK based on the first input related to the PUF response and the set of parameters. In one embodiment, the set of parameters comprises (a) a credential supplied by a user, (b) a sequential number, (c) a randomly generated number, (d) parameters of a cryptographic algorithm, or (e) two or more of (a)-(d).

In one embodiment, the DEK generation module comprises a key decryption module configured to obtain the first input related to the PUF response, obtain an encrypted DEK from the storage, and generate the DEK by decrypting the encrypted DEK based on the first input. In one embodiment, the storage device is configured to store a plurality of challenges associated with a plurality of credentials, respectively. The at least one credential received from the host is at least one of the plurality of credentials. The PUF is configured to obtain the challenge from the storage. The challenge is one of the plurality of challenges, respectively, associated with the at least one credential received from the host. In one embodiment, the authentication module is configured to provide the challenge to the PUF. The challenge is (a) a transformed credential, (b) a further transformed version, using the OWF, of the transformed credential, or (c) a second output generated based on the at least one credential by the OWF that is differently parametrized.

In one embodiment, the storage device further comprises an error correction module configured to perform error correction on the PUF response based on helper data to provide an error-corrected PUF response as the first input to the DEK generation module.

In one embodiment, the storage device further comprises an Exclusive-OR (XOR) module, and the DEK generation module comprises a KDF. The XOR module is configured to obtain an offset from the storage, obtain the PUF response from the PUF, and generate a third output based on the offset and the PUF response. The first input used by the KDF to generate the DEK is related to the third output from the XOR module. In one embodiment, the offset is associated to the at least one credential received from the host. In one embodiment, the authentication module is configured to provide the challenge to the PUF. The challenge is (a) a transformed credential, (b) a further transformation using the OWF of the transformed credential, or (c) a second output generated based on the at least one credential by an OWF that is differently parametrized. In one embodiment, the storage device further comprises an error correction module configured to perform error correction on the third output of the XOR module based on helper data to provide an error-corrected third output of the XOR module as the first input to the KDF.

Corresponding embodiments of a method implemented in a storage device are also disclosed. In one embodiment, a method of operation of a storage device for protecting data by encrypting with a DEK, comprises generating, by an authentication module, a first transformed credential based on at least one credential received from a host, authenticating the at least one credential received from the host based on a comparison of the first transformed credential and a second transformed credential obtained from storage, generating, by a PUF, a PUF response based on a challenge, responsive to successful authentication of the at least one credential received from the host, generating a DEK based on a first input related to the PUF response, performing encryption of data to be stored in encrypted data storage of the storage device using the DEK and/or decryption of data that is accessed by the host from the encrypted data storage of the storage device using the DEK.

In one embodiment, the authentication module comprises an OWF configured to receive the at least one credential and generate the first transformed credential based on the at least one credential. In one embodiment, the challenge is based on: (a) the at least one credential, (b) a stored, pre-generated challenge, or (c) a combination thereof.

In one embodiment, generating the DEK comprises generating the DEK via a KDF based on the first input related to the PUF response. In one embodiment, the method further comprises storing a plurality of challenges associated with a plurality of credentials, respectively. The at least one credential received from the host is one of the plurality of credentials. Generating, by the PUF, the PUF response based on the challenge comprises obtaining, by the PUF, the challenge from the storage. The challenge is one of the plurality of challenges and is associated with the at least one credential received from the host. In one embodiment, generating, by the PUF, the PUF response based on the challenge comprises providing, by the authentication module, the challenge to the PUF. The challenge is equal to (a) a transformed credential, (b) a further transformed version, using the OWF, of the transformed credential, or (c) a second output generated based on the at least one credential by the OWF that is differently parametrized.

In one embodiment, generating the DEK comprises obtaining a set of parameters from the storage and generating the DEK, via the KDF, based on the first input related to the PUF response and the set of parameters. In one embodiment, the set of parameters comprises (a) a credential supplied by a user, (b) a sequential number, (c) a randomly generated number, (d) parameters of a cryptographic algorithm, or (e) two or more of (a)-(d).

In one embodiment, generating the DEK comprises obtaining the first input related to the PUF response, obtaining an encrypted DEK from the storage, and decrypting the encrypted DEK based on the first input to provide the DEK. In one embodiment, the method further comprises storing a plurality of challenges associated with a plurality of credentials, respectively. The at least one credential received from the host is one of the plurality of credentials. Generating, by the PUF, the PUF response based on the challenge comprises obtaining, by the PUF, the challenge from the storage. The challenge is one of the plurality of challenges and is associated with the at least one credential received from the host. In one embodiment, generating, by the PUF, the PUF response based on the challenge comprises providing, by the authentication module, the challenge to the PUF. The challenge is equal to (a) a transformed credential, (b) a further transformed version, using the OWF, of the transformed credential, or (c) a second output generated based on the at least one credential by the OWF that is differently parametrized.

In one embodiment, the method further comprises performing error correction of the PUF response based on helper data to provide an error-corrected PUF response as the first input used for generating the DEK.

In one embodiment, the method further comprises performing an XOR operation on (a) an offset that is associated to the at least one credential and (b) the PUF response. Generating the DEK comprises generating the DEK based on a result of performing the XOR operation. In one embodiment, the offset is associated to the at least one credential received from the host. In one embodiment, generating, by the PUF, the PUF response based on the challenge comprises providing, by the authentication module, the challenge to the PUF. The challenge is equal to (a) a transformed credential, (b) a further transformed version, using the OWF, of the transformed credential, or (c) a second output generated based on the at least one credential by the OWF that is differently parametrized. In one embodiment, the method further comprises performing error correction on the result of performing the XOR operation to provide an error-corrected result that is provided as the first input to the KDF for generating the DEK.

BRIEF DESCRIPTION OF THE DRAWINGS

The accompanying drawing figures incorporated in and forming a part of this specification illustrate several aspects of the disclosure, and together with the description serve to explain the principles of the disclosure. Optional features are represented by dashed boxes.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Before describing embodiments of the present disclosure, a discussion of existing solutions and problems associated to the existing solutions is beneficial. In this regard, U.S. Pat. No. 10,079,678, titled "Providing access to encrypted data" to Smith et al. (hereinafter "Smith"), describes a solution where an authenticated user receives a Physically Unclonable Function (PUF) key to decrypt a storage module, e.g., a Full Disk Encryption (FDE) storage device. The storage device itself in Smith does not perform any computation but receives a Data Encryption Key (DEK) from a "non-transitory computing device-readable storage medium." In some embodiments of Smith, the received DEK is used to unlock the storage device.

U.S. Pat. No. 10,097,348, titled "Device bound encrypted data" to Kara-Ivanov et al. (hereinafter "Kara-Ivanov"), describes a storage device that implements a solution where the hash of incoming data is used to as a PUF challenge. The PUF in Kara-Ivanov generates a response that, together with a user-supplied password, creates a cryptographic key. The key in Kara-Ivanov is, in turn, used to encrypt data.

Chinese Patent Application Publication No. CN109522758A, titled "Hard disk data management method and hard disk" to Suzhou et al. (hereinafter "Suzhou") has the same concept as Kara-Ivanov but, instead, uses address information of logical block or data classification information to derive a challenge. Suzhou's solution does not use a credential.

U.S. Pat. No. 9,214,183, titled "Secure storage" to Rijnswou (hereinafter "Rijnswou"), describes a system for storing digital data. The system of Rijnswou contains a storage device such as a hard drive, a compact disk, or an embedded memory. In Rijnswou, each unit of data has an identifier supplied to the PUF, possibly together with a username and an authentication token.

Figure 1:
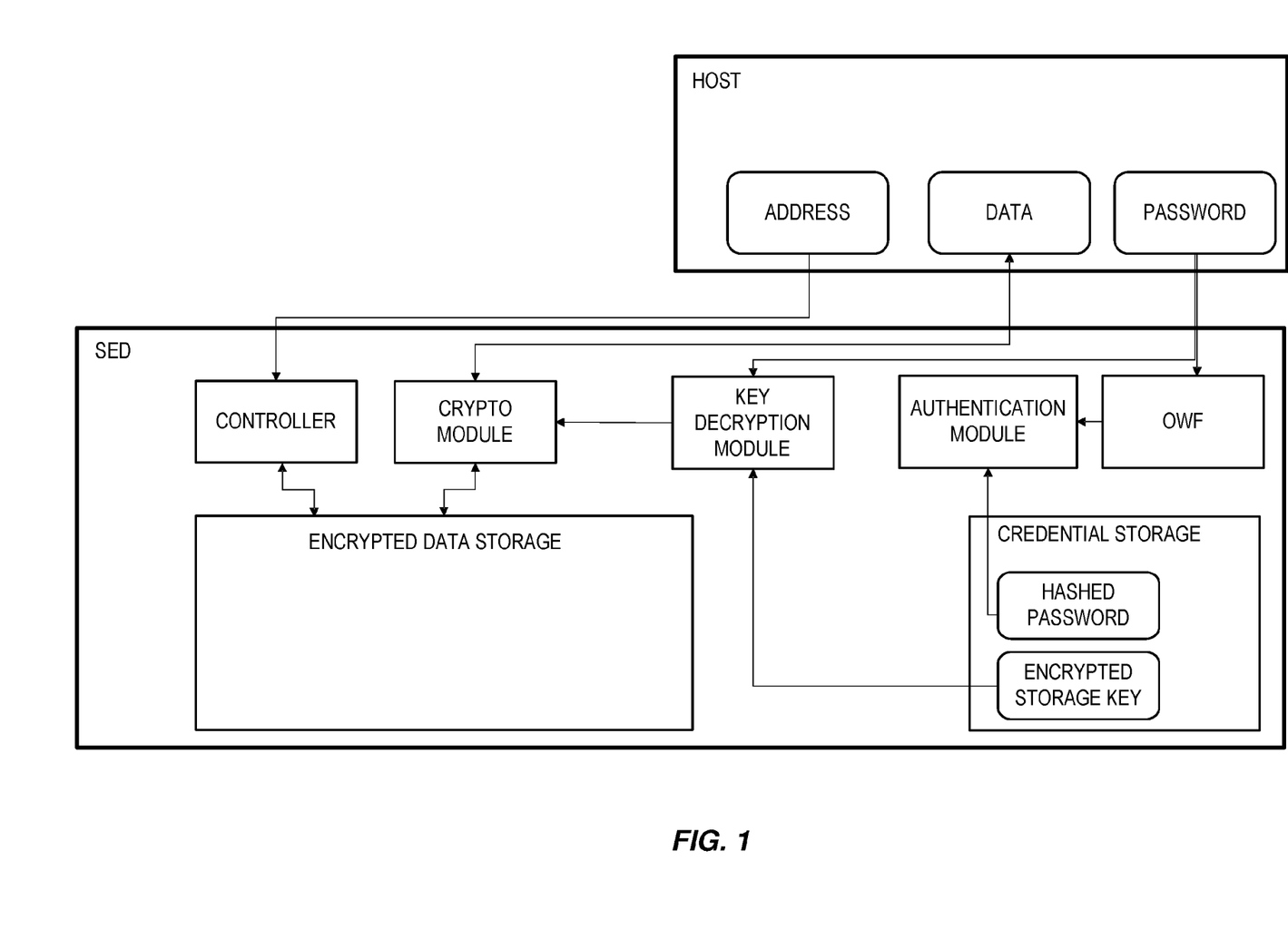
FIG. 1 illustrates one example of current implementations of a Self-Encrypting Disk (SED) and a host under the Trusted Computing Group (TCG) Opal standard.

FIG. 1 illustrates an example of current implementations of a Self-Encrypting Drive (SED) under the Trusted Computing Group (TCG) Opal standard. As illustrated, the SED includes a One-Way Function (OWF), an authentication module, a key decryption module, and a crypto module. The OWF receives a password from a host and forwards a transformed password (e.g., a hashed password) to the authentication module. The authentication module then authenticates the received password by comparing the transformed password with a hashed password stored at the SED. If the authentication module determines that the transformed password is valid and legitimate, an encrypted storage key is forwarded to the key decryption module. Next, the key decryption module generates a DEK based on the received encrypted storage key. The crypto module uses the DEK to encrypt incoming data to the SED or to decrypt outgoing data to the host.

The main problem with all current solutions is the need to store keys on the device, encrypted with passwords. An attacker who manages to extract the encrypted DEK(s) from a hard drive can use offline "brute-force" to crack the password(s) used to encrypt the DEK(s). That is, the attacker does not need access to the hard drive after having extracted the encrypted DEK(s). A brute-force attack is an attempt to guess a secret (for example, a password or an encryption key) by systematically checking every possible option. The increasing computational power of computers makes it computationally practical to guess longer and longer passwords.

Another issue with the current implementations of the SED is that, when the SED is unlocked, the decrypted keys are kept in a volatile memory and might be exposed to attacks, especially if the Random-Access Memory (RAM) is placed off-chip. Furthermore, when the SED enters a low energy mode, e.g., sleep mode, the storage is allowed, according to the TCG Opal standard, to store the current state of the volatile memory, as well as decrypted keys, in non-volatile memory. Another more expensive alternative is to keep power on for a small portion of the device where the keys are stored, possibly backed up by a battery.

Generating entropy might be problematic for storage devices as the storage devices may lack the correct implementation or capability to create true randomness. This makes the SED vulnerable to weak key attacks and attacks aimed at, e.g., Pseudo Random Number Generator (PRNG) implementations.

The TCG Opal standard requires that several users can access the same data using different passwords. With the current SED solutions, the TCG Opal standard requires the same key to exist in several versions, encrypted with different passwords. However, if the encryption is based on Exclusive OR (XOR)-encrypting the key with the plaintext password, physical attacks extracting the ciphertext lead to recovery of the key. Hence, the physical attacks may jeopardize all users, as knowledge of the key exposes all passwords.

Alternatively, a commonly used procedure is to derive a DEK encryption/decryption key using a Key Derivation Function (KDF), e.g., PBKDF2, and use the derived key to encrypt the DEK. The encrypted version of the DEK is stored for each user/password. As the encrypted DEKs are stored on disk and potentially can be extracted by a physical attack, the DEK and passwords are still vulnerable to an offline brute-force/dictionary attacks.

Smith (U.S. Pat. No. 10,079,678) does not describe a storage device, such a SED, which has crypto module and PUF. In Smith, all cryptographic operations and the PUF are outside of the device. Kara-Ivanov (U.S. Pat. No. 10,097, 348) describes a storage device with inline crypto capabilities. The solution of Kara-Ivanov uses a hash of the data to generate a unique key for each content, using a PUF, where the content is exemplified by a digital image. However, as the hash of the data decides the challenge to the PUF and thereby the key, the key will be altered upon every time to the content is altered. To determine the key, the hash of the data must also check every time the updated content is written. Suzhou (Chinese Patent Application Publication No. CN109522758A) does not describe any user input such as a password to generate a key. Rijnswou (U.S. Pat. No. 9,214,183) discloses a PUF that may be co-located with the storage device, which encrypts the data using an identifier for each data unit. In the present disclosure, different keys are created by using a differently seeded KDF. In Rijnswou, the identifier, which may be a password, is not validated prior to sending the identifier as a challenge to the PUF, nor does Rijnswou include credential storage.

The present disclosure provides solutions to the aforementioned and/or other problems. More specifically, systems and methods are disclosed herein for a secure storage device, such as a SED, that uses a PUF to generate DEKs. Prior to gaining access to the PUF, a host (or its user) is authenticated using a credential such as a password, a Personal Identification Number (PIN), or biometric data. After successful authentication of the credential, the PUF receives a challenge based on the credential, a stored, pre-generated random challenge, or a combination thereof and generates a response based on the challenge. The response from the PUF ("PUF response") is then used to create a DEK, e.g., where a range of data on the SED is encrypted using the DEK. In one embodiment, each several different DEKs may be generated for the host (or use) to protect different ranges of data stored on the storage device. DEKs belonging to the same host or user may be created from the same PUF challenge by using different KDF parameters. In one embodiment, the same range of data can be unlocked for different users using the same DEK by generating the DEK based on PUF responses associated to the different credentials of the users and respective offsets. In one embodiment, the PUF response is instead used to decrypt a stored, encrypted DEK.

Figure 2:
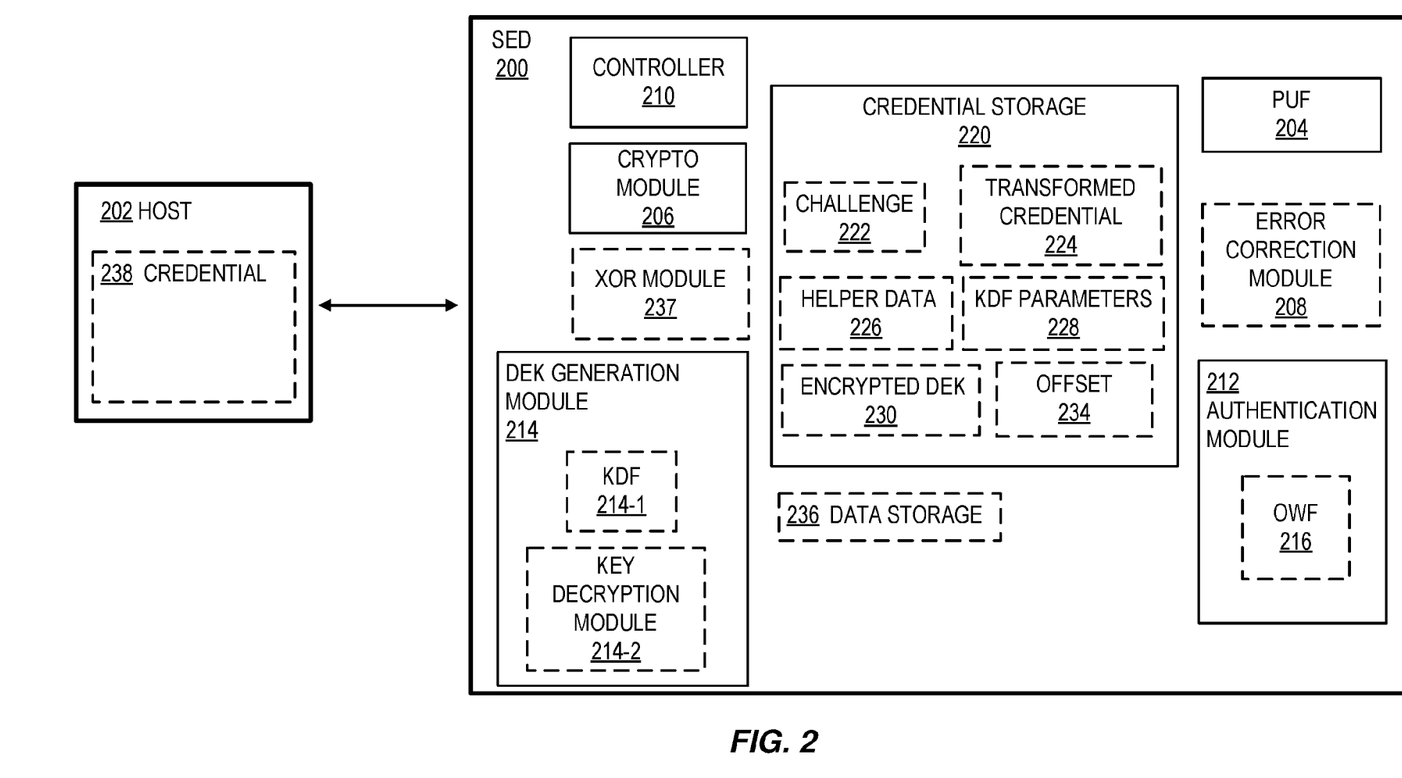
FIG. 2 illustrates components of a host and a SED that utilizes a Physically Unclonable Function (PUF) and generates a Data Encryption Key (DEK) after authenticating a credential received from the host in accordance with one embodiment of the present disclosure.

FIG. 2 illustrates components of a SED 200 and a host 202, where the SED 200 utilizes a PUF 204 to generate a DEK(s) after authenticating a credential received from the host 202 in accordance with one embodiment of the present disclosure. Optional components are represented by dashed lines/boxes. The SED 200 may include the following components:

PUF 204: The PUF 204 takes a challenge and returns a device-unique response. In some embodiments, a PUF with many challenge-response pairs is preferred. In other embodiments, a PUF with a single or a few challenge-response pairs can also be used.

Crypto module 206: The crypto module 206 handles cryptographic procedures (e.g., encryption and/or decryption). For TCG Opal-compliant devices, the crypto module 206 supports the AES, but other symmetric cryptographic algorithms may additionally or alternatively be supported by the crypto module 206. The crypto module 206 may support one or several modes relevant for disk encryption, such as Liskov, Rivest, and Wagner (LRW) and XOR-encrypt-XOR Tweaked-codebook mode with ciphertext Stealing (XTS).

Error correction module 208: The error correction module 208 corrects PUF responses based on helper data 226 (e.g., error-correcting codes) that contains response specific information and/or general knowledge regarding the behavior of the PUF 204.

Controller 210: The controller 210 receives requests from the host 202 for reading/writing data into/out of the SED 200.

Authentication module 212: The authentication module 212 receives a credential from the host 202, generates a transformed version of the credential, and compares the transformed version of the credential with a stored transformed credential. Non-limiting examples of the stored credential are transformed versions of a password, a PIN, or a biometric template.

OWF 216: The OWF 216 may be included in the authentication module 212. The OWF 216 is a function that is easy to compute on every input but hard to invert given the image of a random input. An example of the OWF 216 is a hash function.

DEK generation module 214: The DEK generation module 214 may comprise a KDF 214-1 and/or a Key decryption module 214-2.

KDF 214-1: In some embodiments, the KDF 214-1 is used to create a cryptographic key (i.e., a DEK) from an input that is based on the PUF response. The KDF 214-1 can receive several parameters. Depending on the particular embodiment, the KDF 214-1 could be a OWF or a more complex KDF function, such as Argon2, Scrypt, and Password-Based Key Derivation Function 2 (PBKDF2), to create a key that meets a specific criterion.

Key decryption module 214-2: In some embodiments, the key decryption module 214-2 is used to decrypt encrypted data, such as encrypted DEK, based on an encryption key (e.g., generated by the KDF 214-1) based on an input that is based on the PUF response.

Credential storage area 220: The credential storage area 220 contains non-user-accessible data associated with the PUF 204 or, in some embodiments, encrypted keys. Examples of the non-user-accessible data are:

Challenge 222: The challenge 222 is provided to the PUF 204. The challenge is based on (a) the at least one credential, (b) a stored, pre-generated challenge, or (c) a combination thereof. One aspect of the challenge is that the challenge is unique to a user's credential. In the case where a group of users should be able to access the same data, i.e., a group key derivable by each individual in the group, the challenge may be, instead, unique for the group. The challenge may be pre-generated based on each user's credential. Also, in some embodiments, the challenge is not derived from the user-supplied credential, rather a randomly generated challenge is used, and is connected or otherwise associated with transformed credentials 224. This approach may be used, e.g., as long as the number of randomly generated challenge is sufficiently large such that collisions among the randomly generated challenges are unlikely. In some embodiments, the challenges may be stored in a lookup table, where each of the challenges is connected to or otherwise associated with the transformed credential 224 of the respective user.

Transformed credential 224: The SED 200 (in particular, the authentication module 212 or the OWF 216) receives a credential from the host 202 and one-way transforms (e.g., hashes) the credential to provide a transformed (e.g., hashed) credential. The transformed credential 224 is generated and stored, e.g., during a registration phase when the respective user creates or is otherwise associated to the credential.

Helper data 226: In one embodiment, the helper data 226 is used by the error correction module 208 to correct errors in PUF responses. The PUF 204 may generate PUF responses many times to facilitate the future generation of a stable response. The helper data 226 may be generated based on an analysis the multiple instances of the PUF responses generated by the PUF 204. Alternatively or additionally, the helper data 226 may be predetermined and stored in the SED 200, based on general knowledge regarding the PUF 204 (e.g., discarding unstable bits).

KDF parameter 228: In some embodiments, the KDF 214-1 receives the KDF parameter 228 and uses the parameter to, e.g., generate a different DEK based on a same PUF response (e.g., when different DEKs are used to encrypt/decrypt different ranges of data in the encrypted data storage 236 for the same user). Non-limiting examples of the KDF parameter 228 are parameters unique for the resulting key, such as credential supplied by a user, a sequential number or a randomly generated number, and parameters relating to the operation of the KDF such as the number of iterations, a length of input/output and parameters of a cryptographic algorithm.

Encrypted DEKs 230: In one embodiment, encrypted DEKs are stored in the credential storage 220 of the SED 200. Each DEK is encrypted using a key that is generated based on a PUF response or an input derived from a PUF response.

Offset 234: In one embodiment, the offset 234 defines the binary difference between a first PUF response (e.g., generated responsive to a challenge that is associated to the credential of a first user) and a second PUF response (e.g., generated responsive to a challenge that is associated to the credential of a second user), where the first PUF response is used to generate a cryptographic key (e.g., a DEK that is common to both the first user and the second user where, e.g., the first and second users both have access to the same data range(s) of the secure data storage 236). Alternatively or additionally, the offset can to allow a user to update the credential and still be able to generate the same DEK. In one embodiment, the offset 234 is used by the XOR module 237 to generate the first PUF response from the second PUF response.

Data storage 236: The data storage 236 stores encrypted user data. The data storage 236 may comprise several ranges, encrypted with different keys and possibly belonging to different users.

XOR module 237: In some embodiments, the XOR module 237 uses a particular user's offset 234 to transform a PUF response generated specifically based on the particular user's credential into a common PUF response that is then used to generate a common cryptographic key (e.g., DEK) used to encrypted/decrypt a range(s) of data that is shared by the particular user and one or more additional users.

The host 202 may comprise a memory containing a credential 238, which may be assigned to a user of the host 202.

The SED 200 of the present disclosure stores encrypted data. All data belonging to read/write requests by an authorized host or user are decrypted/encrypted within the SED 200 by the crypto module 206. In other words, the host 202 does not know that the SED 200 is encrypted after the host 202 has unlocked the SED 200 with a credential 238, such as a password. The storage of the SED 200 may be divided into several areas, where at least one area (e.g., credential storage 220) is allocated to store credentials and at least one area (e.g., data storage 236) is allocated to store data. The data storage 236 may comprise several ranges, where each range is encrypted by a specific DEK. Instead of using DEKs stored on the SED 200, which may be vulnerable to probing attacks, a PUF response can be used to directly derive DEKs. This makes it more difficult for an attacker to extract any key material as the key is generated upon request rather than present in a non-volatile memory.

Depending on PUF types and their capabilities, the DEK(s) can be generated using different methods. In one embodiment, in the case where the PUF 204 has many Challenge Response Pairs (CRPs), the challenge is (randomly) generated and stored in the credential storage 220. Alternatively, the challenge may be selected from a pre-defined list of challenges. This method may be particularly beneficial for PUFs that have certain requirements on the valid input challenges. Each stored credential has at least one corresponding challenge which is sent to the PUF upon successful authentication.

Figure 3:
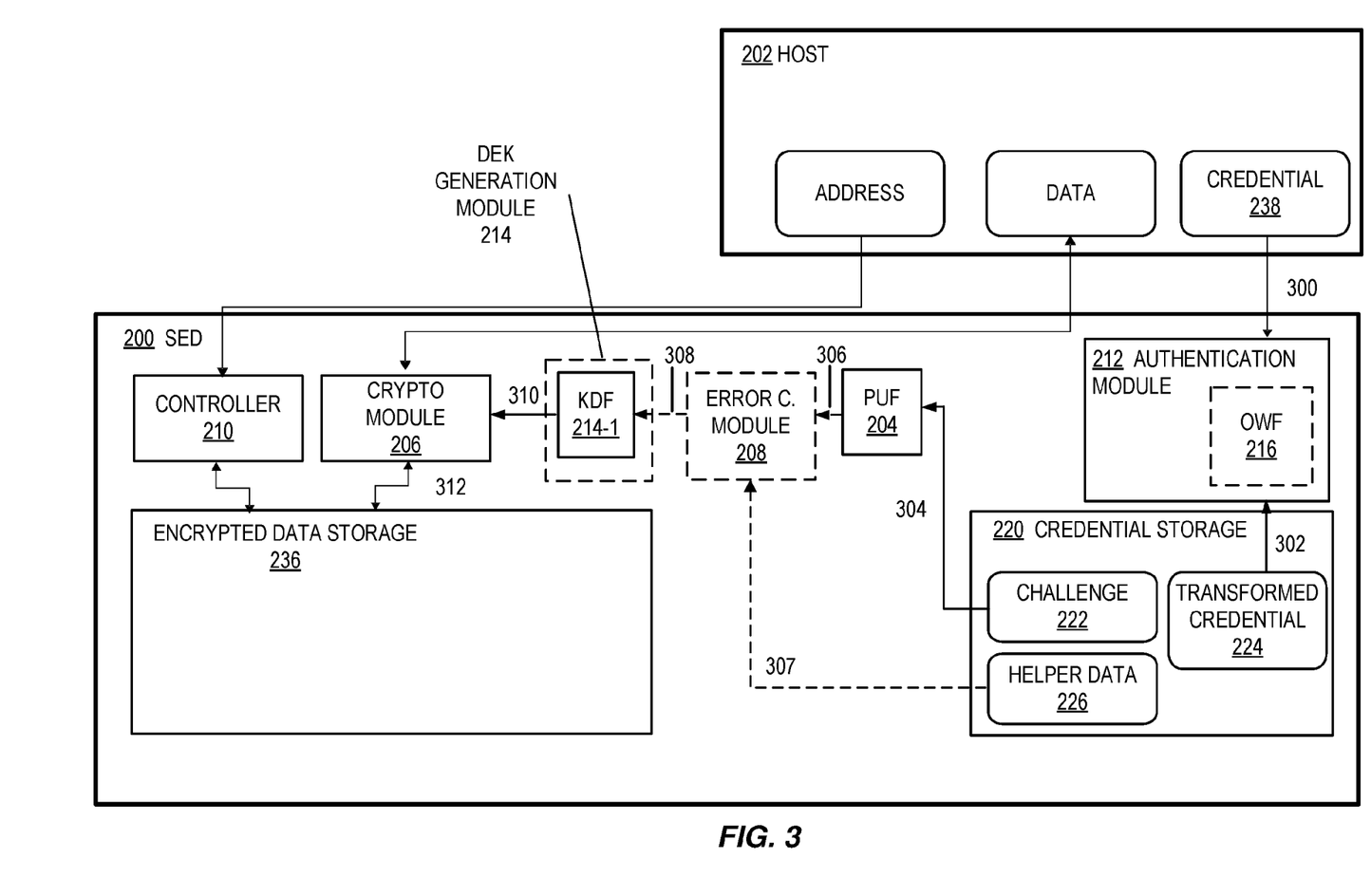
FIG. 3 illustrates one example of the SED that uses a pre-defined challenge as a challenge for the PUF and uses a PUF challenge to create the DEK in accordance with one embodiment of the present disclosure.

FIG. 3 illustrates one example of the SED 200 that uses a pre-defined challenge as a challenge for the PUF 204 and uses a PUF challenge to create the DEK. Optional components are represented by dashed lines/boxes.

Step 300: The host 202 supplies the credential 238 (e.g., a password) to unlock the SED 200. For example, this unlocking step may happen prior to booting the host 202 (e.g., by a Basic Input Output System (BIOS) or a Unified Extensible Firmware Interface (UEFI) firmware), during the booting of the host, or after the host has booted. The authentication module 212 of the SED 200 transforms the received credential 238 and generates a transformed version of the received credential, such as a hashed credential.

Step 302: The authentication module 212 obtains the transformed credential 224 from the credential storage 220 of the SED 200 and compares it with the transformed version of the credential 238. Authentication is successful if there is a match.

Step 304: Responsive to successful authentication of the credential 238 in step 302, the PUF 204 is activated, and the challenge 222 associated to the credential 238 supplied by the host 202 is obtained from the credential storage 220 of the SED 200 and provided to the input of the PUF 204. The challenge 222 may correspond to or be uniquely associated with the credential 238 (or the transformed credential 224).

Steps 306, 307: The PUF 204 generates a PUF response based on the challenge 222 (step 306). Optionally, the error correction module 208 obtains the helper data 226 from the credential storage 220, and performs an error correction on the PUF response based on the helper data 226 (step 307) to thereby provide an error-corrected PUF response.

Step 308: The KDF 214-1 receives the PUF response from the PUF 204 or the error-corrected PUF response from the error correction module 208, depending on the particular embodiment. Based on the (error-corrected) PUF response, the KDF 214-1 generates a DEK.

Steps 310 and 312: The crypto module 206 receives the DEK from the KDF 214-1. When the host 202 requests a writing operation, the incoming data is encrypted by the DEK prior to storing the incoming data on the SED 200. When the host 202 requests a reading operation, the outgoing data is decrypted by the DEK prior to supplying the outgoing data to the host 202.

To change a credential using this embodiment, the challenge used to generate the DEK is associated with the new credential instead.

Figure 4:
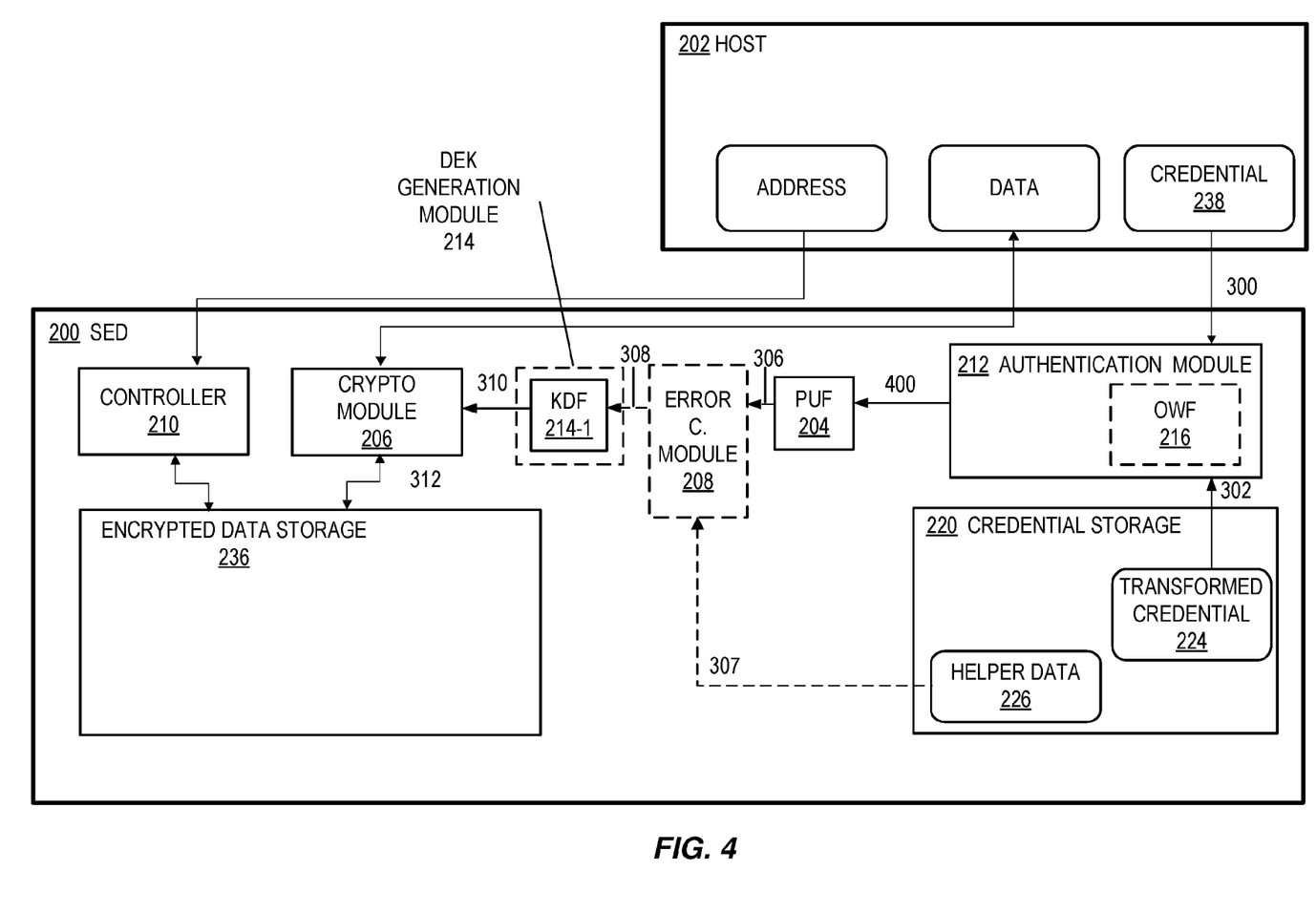
FIG. 4 illustrates one example of the SED that uses the credential or transformed credential to generate a challenge for the PUF and uses the challenge to create the DEK in accordance with one embodiment of the present disclosure.

FIG. 4 illustrates one example of the SED 200 that uses the credential 238 or the transformed credential 224 (e.g., the hashed password) to generate a challenge for the PUF 204, generates a PUF response or an error-corrected PUF response based on the challenge, and uses the PUF response or the error-corrected PUF response to create the DEK. Steps 300 and 302 are the same as in FIG. 3. In step 400, after authenticating the credential 238 based on the transformed credential 224, the authentication module 212 creates a challenge that is equal to (a) a transformed credential, (b) a further transformed version, using the OWF 216) of the credential 238 or the transformed credential 224, or (c) a second output generated based on the credential 238 by the OWF 216 that is differently parametrized as compared to how the OWF 216 is parameterized when transforming the credential 238 for authentication (i.e., for comparison to the stored transformed credential 224). The PUF 204 receives the challenge from the authentication module 212 and generates a PUF response based on the challenge. Steps 306 to 312 are the same as in FIG. 3.

Figure 5:
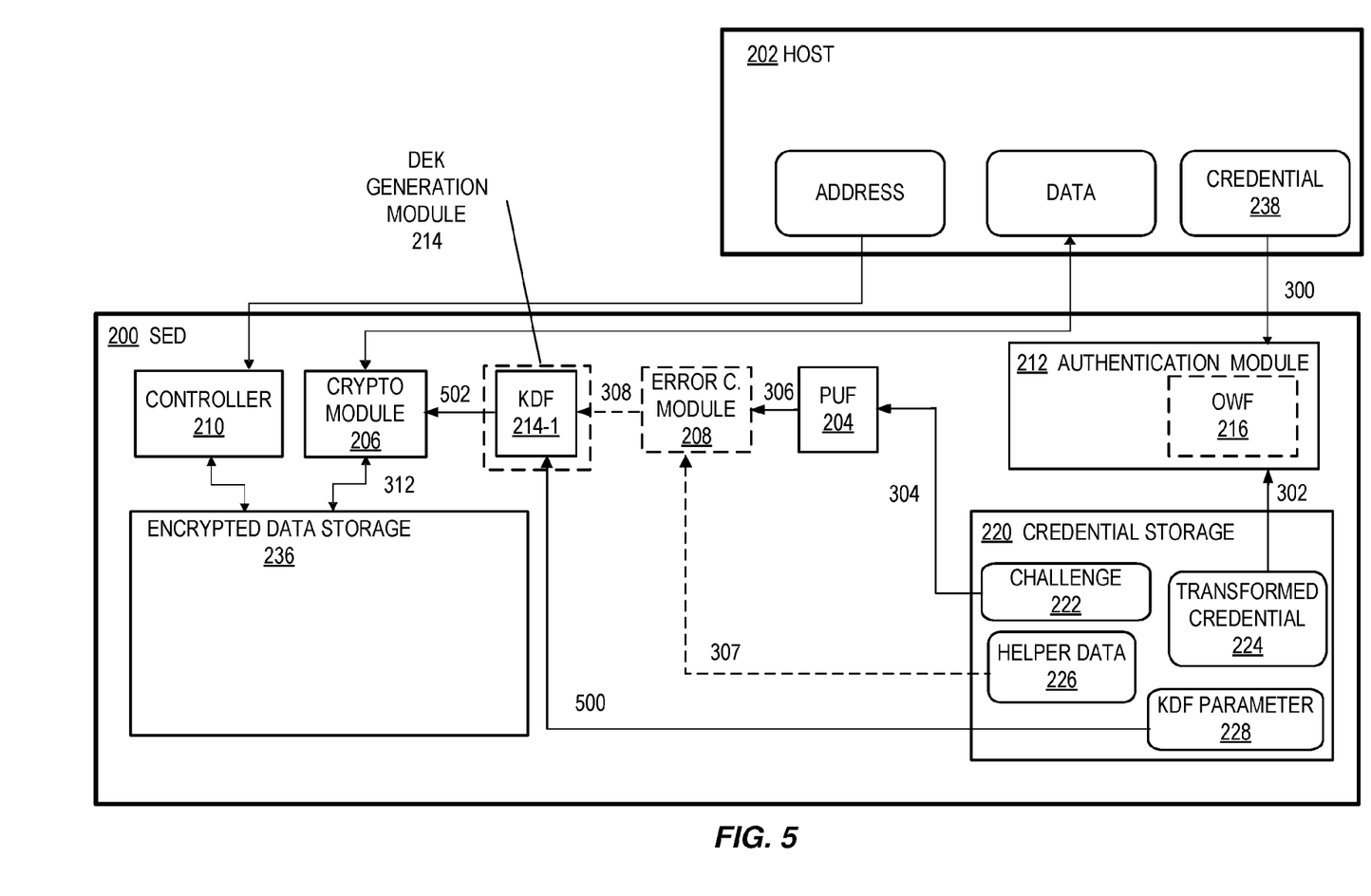
FIG. 5 illustrates one example of the SED that uses a PUF with a single challenge and each transformed credential has an associated Key Derivation Function (KDF) parameter used to derive the DEK in accordance with one embodiment of the present disclosure.

FIG. 5 illustrates one example of the SED 200 that uses the PUF 204 and a KDF parameter 228 associated to the transformed credential 224 to derive a DEK. Note that different KDF parameters 228 may be stored and associated to different transformed credentials 224 (i.e., to different users). In the embodiment illustrated in this figure, the PUF 204 is has one or a few CRPs. Steps 300 to 308 are the same as in FIG. 3. The KDF parameter 228 may be provided to the KDF 214-1 from the credential storage 220 (step 500). The KDF 214-1 then generates a DEK based on the (error-corrected) PUF response and the KDF parameter 228 (step 502). The step 312 is the same as in the FIG. 3.

Figure 6:
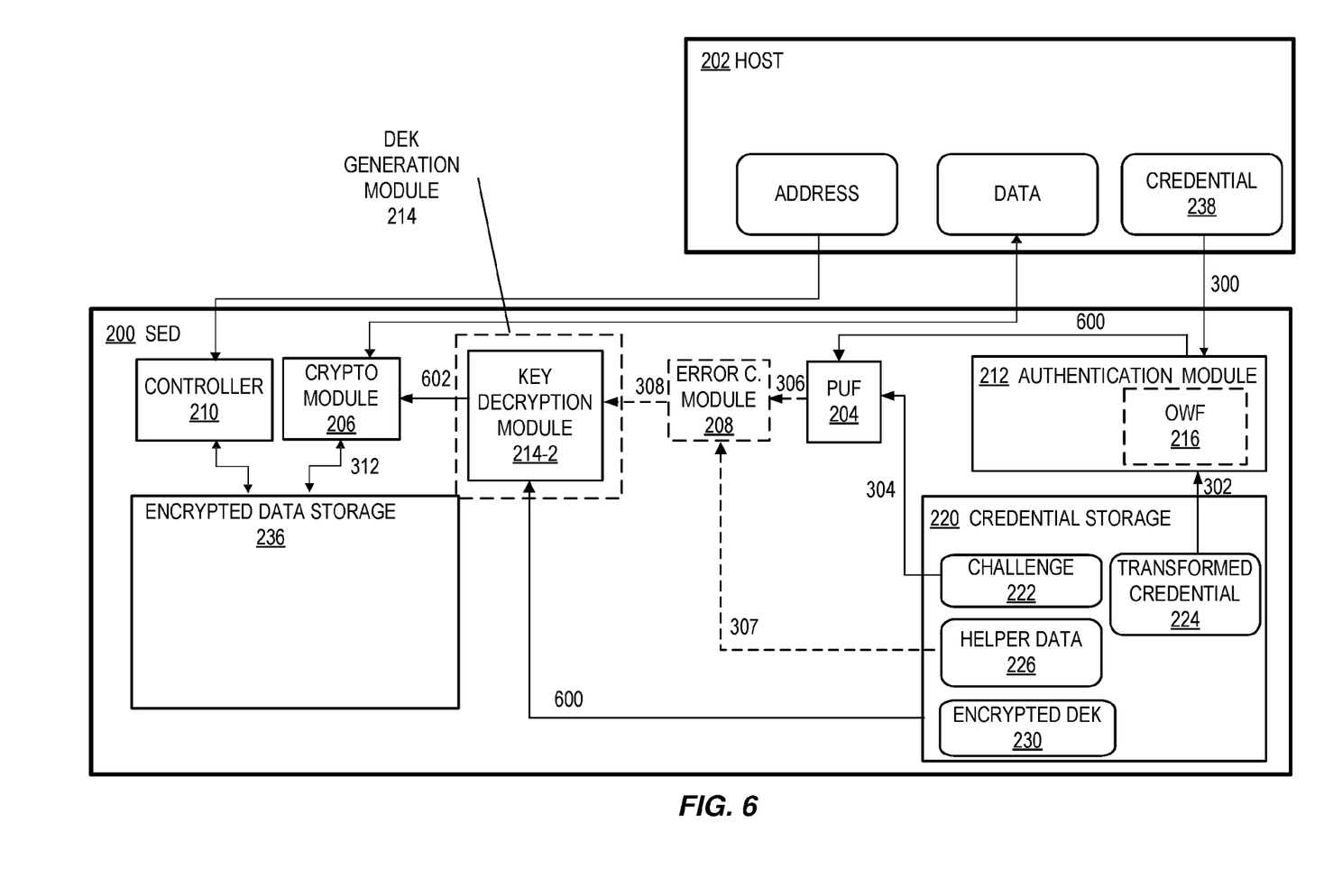
FIG. 6 illustrates one example of the SED that uses a PUF response to decrypt an encrypted DEK in accordance with one embodiment of the present disclosure.

FIG. 6 illustrates one example of the SED 200 that uses a (error corrected) PUF response to decrypt an encrypted DEK. In one embodiment, the SED 200 does not generate the DEK directly from the (error corrected) PUF response output by the PUF 204 but rather has one or several encrypted DEKs 230 stored in the credential storage 220. These encrypted DEKs 230 may be generated by the SED 200, either by using the PUF 204 or a randomness source. Each of these encrypted DEKs 230 are encrypted with a specific (error corrected) PUF response, which is generated by the PUF 204 based on a user-supplied credential, possibly together with a salt, as the challenge. Thus, in order to generate the key needed to decrypt the encrypted DEK 230 associated to the credential 238 (or transformed credential 224) of the user. Once the user is authenticated, the PUF 204 is activated and the challenge associated to the credential 238 (or transformed credential 224) is provided to the PUF 204. The resulting PUF response may be error corrected by the error correction module 208 based on associated helper data 226 stored in the credential storage 220. Once this is done, the key decryption module 214-2 uses the (error corrected) PUF response to decrypt the stored encrypted DEK 230. The decrypted DEK is supplied to the crypto module 206. To change a credential using this embodiment, the DEK is decrypted using the PUF response corresponding to the old password and encrypted by a PUF response belonging to the new credential.

More specifically, the operation of the SED 200 in the embodiment of FIG. 6 is as follows. Steps 300 and 302 are the same as in FIG. 3. The PUF 204 may obtain an output of the authentication module 212 (step 600) and a pre-generated challenge 222 from the credential storage 220 (step 304). Based on the output of the authentication module 212, the pre-generated challenge 222, or a combination thereof, the PUF 204 generates a PUF response (step 306). Optionally, the error correction module 208 obtains the helper data 226 from the credential storage 220, performs an error correction on the PUF response based on the helper data 226 (step 307), thereby generating an error-corrected PUF response. In the embodiment illustrated in FIG. 6, the key decryption module 214-2 obtains an encrypted DEK stored in the credential storage 220 (step 600). The key decryption module 214-2 uses the (error-corrected) PUF response to decrypt the encrypted DEK and generates the DEK (step 602). Step 312 is the same as in FIG. 3.

Figure 7:
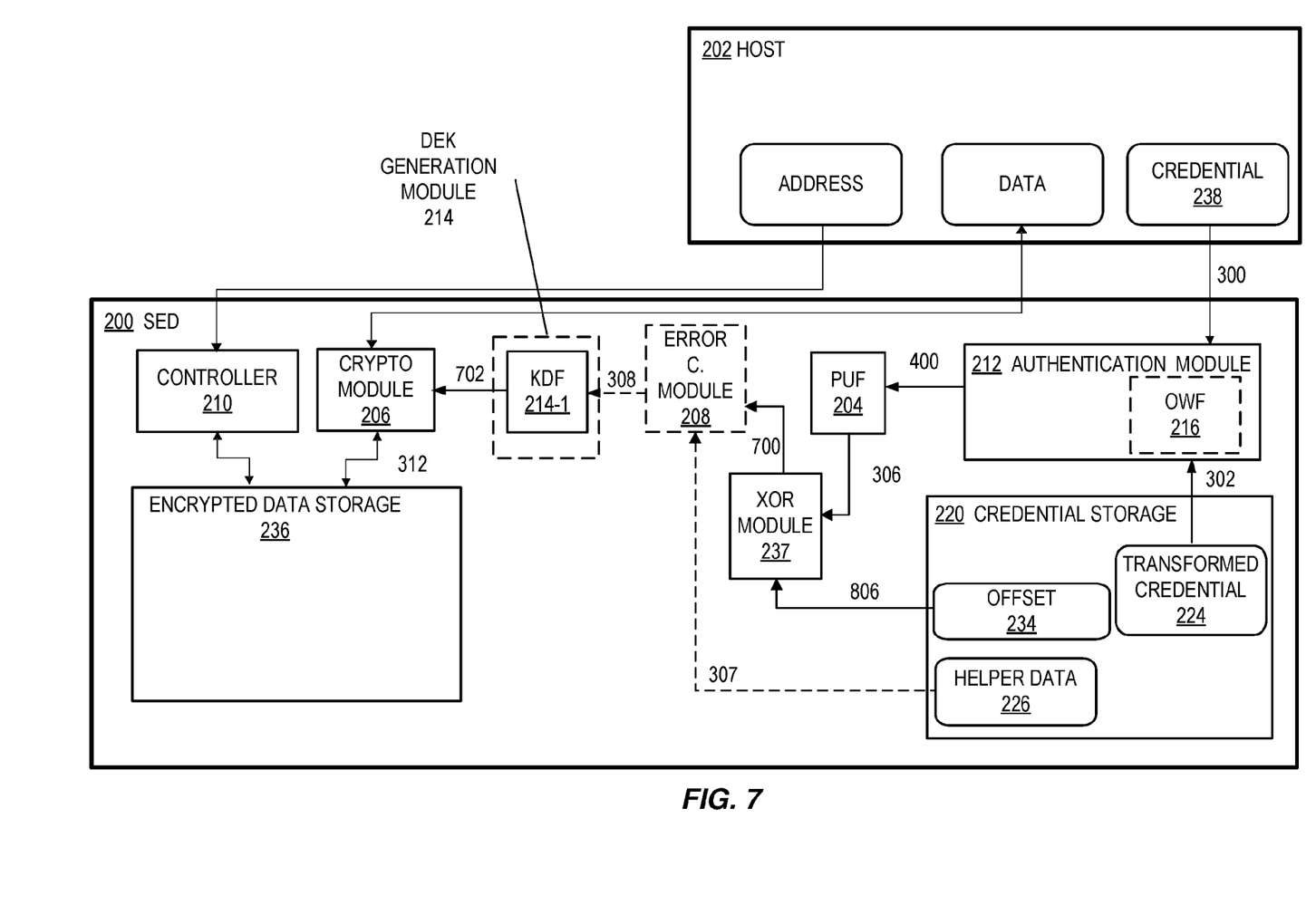
FIG. 7 illustrates one example of the SED that generates one specific DEK based on PUF responses and multiple credentials received from the host by using an exclusive OR (XOR) module and offset data in accordance with one embodiment of the present disclosure.

FIG. 7 illustrates another example of the SED 200 that generates a common DEK based on PUF responses generated by the PUF 204 for multiple credentials received from the host 202. As described below, in this embodiment, this is done by using the XOR module 237 and offset data. When a first user provides its credential ("first credential") to the SED 200, a DEK is generated by the PUF 204 and the KDF 214-1 based on the first credential as discussed above and illustrated in the figures (e.g., FIG. 4). Now, assuming that the same DEK is to be generated for a second user (e.g., the first and second users have different credentials for unlocking the SED 200 or a particular range(s) of data stored in the encrypted data storage 236, it is desirable for the same DEK to be generated based on the credentials of the second user as was generated based on the credential of the first user.) To accomplish this, an offset 234 is stored in association with the credential 238 of the second user ("second credential") or the transformed credential 224 of the second user, where the offset 234 is an offset (e.g., the binary difference) between the first PUF response output by the PUF 204 based on the credential of the first user and a second PUF output by the PUF 204 based on the credential of the second user. When the second user provides the second credential to the SED 200, the PUF 204 generates the second PUF response based on an output of the authentication module 212, which is generated based on the second credential (step 306). Optionally, the error correction module 208 obtains the helper data 226 from the credential storage 220, performs an error correction on the second PUF response based on the helper data 226 (step 307), thereby generating an error-corrected second PUF response. The XOR module 237 performs an XOR operation on the (error-corrected) second PUF response and the offset 234 to thereby generate an output as a result of the XOR operation (step 700). The KDF 214-1 generates a DEK based on the output of the XOR module 237 (702). Importantly, by using the output of the XOR module 237, the input used by the DEK generation module 214 (e.g., the KDF 214-1) is the same as that used when the credential of the first user is supplied to the SED 200 and, as such, the generated DEK is the same DEK generated based on the first credential (702). Thus, in this embodiment, by using the offset 234 and the XOR module 237, multiple users' credentials may be used to create the same DEK. This example can also be applied to a user updating the credential, wherein the first credential is an obsolete credential and the second credential is the credential which should be allowed to decrypt the storage device.

ALTERNATIVE EMBODIMENTS

In one embodiment, to increase resistance to physical attacks, the entire credential storage can be encrypted by a PUF-generated credential storage encryption key. In other words, the challenges and the corresponding helper data, used to create the credential storage encryption key, are stored in cleartext and the rest of the credential storage is encrypted. This provides an additional layer of security against offline computing of hashed passwords.

In one embodiment, all data on the device can be invalidated by reconfiguring the PUF 204. A reconfigurable PUF has an internal state, either logical or physical, which can be used to alter the entire set of CRPs. This causes all data on the disk to be destroyed as none of the keys generated by the PUF 204, used for encryption and decryption of the data, will be possible to derive again after the reconfiguration.

In one embodiment, when a DEK is deleted, the PUF response used to generate the key can still be produced. In the common case, this is avoided by the attacker not being able to bypass the authentication module and the data being overwritten over time. However, if the password has been compromised, it gives an extra layer of security if the PUF 204 is not able to reproduce the response at all. This feature can be obtained by using an erasable PUF, where the challenge may be blacklisted to produce a null response. Alternatively, the PUF 204 can be physically altered to generate a different response for a specific challenge. Alternatively, the authentication module can maintain a blacklist of challenges that have been revoked and are not allowed to be passed through to the PUF 204.

The present disclosure discusses the method of generating the key in the context of the SED 200. The method is, however, applicable for all types of encrypted storage devices and can easily be used by integrated components in phones and tablets (e.g. flash memories) as well as external USB-connected drives. By protecting the communication channel between the host 202 and the SED 200, e.g. by asymmetric cryptography, the method can also be used for cloud-based storage devices.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is any inconsistency between abbreviations, preference should be given to how it is used above. If listed multiple times below, the first listing should be preferred over any subsequent listing(s).

| AES | Advanced Encryption Standard |
|---|---|
| AK | Authentication Key |
| ATA | Advanced Technology Attachment |
| BBRAM | Battery Backup Random Access Memory |
| BIOS | Basic Input Output System |
| CPU | Central Processing Unit |
| CPU | Central Processing Unit |
| DEK | Data Encryption Key |
| DMA | Direct Memory Access |
| FDE | Full Disk Encryption |
| FIB | Focused Ion Beams |
| HMAC | Hash-based Message Authentication Code |
| KDF | Key Derivation Function |
| KEK | Key Encryption Key |
| LRW | Liskov, Rivest, and Wagner |
| MAC | Message Authentication Code |
| MEK | Media Encryption Key |
| OTP | One-Time Programmable memory |
| OWF | One-Way Function |
| PBKDF2 | Password-Based Key Derivation Function 2 |
| PIN | Personal Identification Number |
| PRF | Pseudo Random Function |
| PRNG | Pseudo Random Number Generator |
| PUF | Physically Unclonable Function |
| RAM | Random-Access Memory |
| SED | Self-Encrypting Drive |
| SRAM | Static Random-Access Memory |
| TCG | Trusted Computing Group |
| UEFI | Unified Extensible Firmware Interface |
| USB | Universal Serial Bus |
| XOR | eXclusive OR |
| XTS | XOR-encrypt-XOR Tweaked-codebook mode with ciphertext Stealing |

Those skilled in the art will recognize improvements and modifications to the embodiments of the present disclosure. All such improvements and modifications are considered within the scope of the concepts disclosed herein.

The invention claimed is:

1. A storage device for protecting data by encrypting with a Data Encryption Key (DEK), the storage device being communicatively coupled to a host, the storage device comprising:
   a one-way function (OWF) configured to receive at least one credential from the host, generate a first transformed credential based on the at least one credential, obtain a second transformed credential from credential storage, and compare the first transformed credential and the second transformed credential;
   a Physically Unclonable Function (PUF) configured to generate a PUF response based on a challenge, responsive to a match between the first transformed credential and the second transformed credential;
   a DEK generation module configured to obtain a first input related to the PUF response and generate a DEK based on the first input; and
   a cryptographic module configured to obtain the DEK from the DEK generation module and to perform one or more of the following using the DEK: encryption of data to be stored in encrypted data storage of the storage device, and decryption of data being accessed by the host from the encrypted data storage of the storage device.

2. The storage device of claim 1, wherein the challenge is based on: (a) the at least one credential, (b) a stored, pre-generated challenge, or (c) a combination thereof.

3. The storage device of claim 1, wherein the DEK generation module comprises a Key Derivation Function (KDF) configured to obtain the first input related to the PUP response and generate the DEK based on the first input.

4. The storage device of claim 3, wherein:
the storage device is configured to store a plurality of challenges associated with a plurality of credentials, respectively;
the at least one credential received from the host is at least one of the plurality of credentials; and
the PUF is configured to obtain the challenge from the storage, the challenge being one of the plurality of challenges and being associated with the at least one credential received from the host.

5. The storage device of claim 3, wherein the challenge is one of the following generated by the OWF:
(a) the first transformed credential,
(b) a further transformed version of the first transformed credential, or
(c) a second output generated based on the at least one credential, the second output being differently parametrized than the first transformed credential.

6. The storage device of claim 5, wherein the KDF is additionally configured to:
obtain a set of parameters from the storage; and
generate the DEK further based on the set of parameters.

7. The storage device of claim 6, wherein the set of parameters comprises one or more of the following: (a) a credential supplied by a user, (b) a sequential number, (c) a randomly generated number, (d) parameters of a cryptographic algorithm, and (e) parameters altering the behavior of the KDF.

8. The storage device of claim 1, wherein the DEK generation module comprises a key decryption module configured to obtain the first input related to the PUF response, obtain an encrypted DEK from the storage, and generate the DEK by decrypting the encrypted DEK based on the first input.

9. The storage device of claim 8, wherein:
the storage device is configured to store a plurality of challenges associated with a plurality of credentials, respectively;
the at least one credential received from the host is at least one of the plurality of credentials; and
the PUF is configured to obtain the challenge from the storage, the challenge being one of the plurality of challenges, respectively, associated with the at least one credential received from the host.

10. The storage device of claim 8, wherein the challenge is one of the following generated by the OWF:
(a) the first transformed credential,
(b) a further transformed version of the first transformed credential, or
(c) a second output generated based on the at least one credential, the second output being differently parametrized than the first transformed credential.

11. The storage device of claim 1 further comprising an error correction module configured to perform error correction on the PUF response based on helper data to obtain an error-corrected PUF response that is provided as the first input to the DEK generation module.

12. The storage device of claim 1, further comprising an Exclusive-OR (XOR) module, wherein:
the DEK generation module comprises a Key Derivation Function (KDF) configured to generate the DEK based on the first input;
the XOR module is configured to obtain an offset from the storage, obtain the PUF response from the PUF, and generate a third output based on the offset and the PUF response; and the first input used by the KDF to generate the DEK is related to the third output from the XOR module.

13. The storage device of claim 12, wherein the offset is associated to the at least one credential received from the host.

14. The storage device of claim 12, wherein the challenge is equal to one of the following generated by the OWF:
(a) the first transformed credential,
(b) a further transformed version of the first transformed credential, or
(c) a second output generated based on the at least one credential, the second output being differently parametrized than the first transformed credential.

15. The storage device of claim 1 further comprising an error correction module configured to perform error correction on the third output of the XOR module based on helper data to obtain an error-corrected result that is provided as the first input used to generate the DEK.

16. A method of operation of a storage device for protecting data by encrypting with a Data Encryption Key (DEK), comprising:
generating, by a one-way function (OWF), a first transformed credential based on at least one credential received from a host;
comparing the first transformed credential and a second transformed credential obtained from storage;
generating, by a Physically Unclonable Function (PUF), a PUF response based on a challenge, responsive to a match between the first transformed credential and the second transformed credential;
generating a DEK based on a first input related to the PUF response; and
performing one or more of the following using the DEK:
encryption of data to be stored in encrypted data storage of the storage device, and decryption of data being accessed by the host from the encrypted data storage of the storage device.

17. The method of claim 16, wherein the challenge is based on: (a) the at least one credential, (b) a stored, pre-generated challenge, or (c) a combination thereof.

18. The method of claim 16, wherein the DEK is generated via a Key Derivation Function (KDF) based on the first input related to the PUF response.

19. The method of claim 18, wherein:
the method further comprises storing a plurality of challenges associated with a plurality of credentials, respectively, the at least one credential received from the host being one of the plurality of credentials; and
generating, by the PUF, the PUF response based on the challenge comprises obtaining, by the PUF, the challenge from the storage, the challenge being one of the plurality of challenges and being associated with the at least one credential received from the host.

20. The method of claim 18, wherein the challenge is equal to one of the following generated by the OWF:
(a) the first transformed credential,
(b) a further transformed version of the first transformed credential, or
(c) a second output generated based on the at least one credential, the second output being differently parametrized than the first transformed credential.

21. The method of claim 18, wherein:
generating the DEK comprises obtaining a set of parameters from the storage; and
the DEK is generated, via the KDF, further based on the set of parameters.

22. The method of claim 21, wherein the set of parameters comprises one or more of the following: (a) a credential supplied by a user, (b) a sequential number, (c) a randomly generated number, (d) parameters of a cryptographic algorithm, and (e) parameters altering the behavior of the KDF.

23. The method of claim 16, wherein generating the DEK comprises:
obtaining the first input related to the PUF response;
obtaining an encrypted DEK from the storage; and
decrypting the encrypted DEK based on the first input to provide the DEK.

24. The method of claim 23, wherein:
the method further comprises storing a plurality of challenges associated with a plurality of credentials, respectively, the at least one credential received from the host being one of the plurality of credentials; and
generating, by the PUF, the PUF response based on the challenge comprises obtaining, by the PUF, the challenge from the storage, the challenge being one of the plurality of challenges and being associated with the at least one credential received from the host.

25. The method of claim 23, wherein the challenge is equal to one of the following generated by the OWF:
(a) the first transformed credential,
(b) a further transformed version of the first transformed credential, or
(c) a second output generated based on the at least one credential, the second output being differently parametrized than the first transformed credential.

26. The method of claim 16, further comprising performing error correction of the PUF response based on helper data to obtain an error-corrected PUF response that is provided as the first input used for generating the DEK.

27. The method of claim 16, further comprising performing an Exclusive-OR (XOR) operation on: (a) an offset that is associated with the at least one credential and (b) the PUF response, wherein generating the DEK comprises generating the DEK based on a result of performing the XOR operation.

28. The method of claim 27, the offset is associated to the at least one credential received from the host.

29. The method of claim 27, wherein the challenge is equal to one of the following generated by the OWF:
(a) the first transformed credential,
(b) a further transformed version of the first transformed credential, or
(c) a second output generated based on the at least one credential, the second output being differently parametrized than the first transformed credential.

30. The method of claim 27, further comprising performing error correction on a result of the XOR operation to obtain an error-corrected result that is provided as the first input used for generating the DEK.

* * * * *